United States Patent [19]

McLaughlin et al.

[11] Patent Number: 4,874,475

[45] Date of Patent: Oct. 17, 1989

[54] MOLTEN SALT EXTRACTIVE DISTILLATION PROCESS FOR ZIRCONIUM-HAFNIUM SEPARATION

[75] Inventors: David F. McLaughlin, Oakmont; Richard A. Stoltz, Murrysville Boro, both of Pa.

[73] Assignee: Westinghouse Electric Corp., Pittsburgh, Pa.

[21] Appl. No.: 242,570

[22] Filed: Sep. 12, 1988

[51] Int. Cl.$^4$ .................. B01D 3/40; C01G 25/04; C01G 27/04; C22B 34/14

[52] U.S. Cl. .................. 203/51; 203/98; 203/DIG. 16; 203/DIG. 25; 75/84.5; 204/64 T; 204/130; 423/73; 423/492

[58] Field of Search .................. 203/51, 50, 32, 39, 203/29, DIG. 16, DIG. 25, 26, 98; 423/73, 76, 492, 72, 78; 204/64 T, 130; 75/84.5

[56] References Cited

U.S. PATENT DOCUMENTS

| | | | |
|---|---|---|---|
| 1,582,860 | 0/1976 | van Arkel | 423/73 |
| 2,214,211 | 9/1940 | Von Zeppelin | 75/84 |
| 2,816,814 | 12/1957 | Plucknett | 203/71 |
| 2,852,446 | 9/1958 | Bromberg | 203/1 |
| 2,905,613 | 9/1959 | Tomonari | 204/216 |
| 2,920,027 | 1/1960 | Dean | 204/218 |
| 2,928,722 | 3/1960 | Scheller | 203/51 |
| 2,938,769 | 5/1960 | Overholser | 423/70 |
| 2,942,969 | 6/1960 | Doyle | 75/84.5 |
| 3,006,719 | 10/1961 | Miller | 423/70 |
| 3,600,284 | 8/1971 | Martinez | 204/39 |
| 3,671,186 | 6/1972 | Ishizuka | 423/73 |
| 3,764,493 | 10/1973 | Nicks | 204/64 R |
| 3,966,458 | 6/1976 | Spink | 423/73 |
| 4,021,531 | 5/1977 | Besson et al. | 423/73 |
| 4,127,409 | 11/1978 | Megy | 75/84.5 |
| 4,285,724 | 8/1981 | Becker | 75/84.4 |
| 4,443,306 | 4/1984 | Armand et al. | 204/64 T |
| 4,511,399 | 4/1985 | Kwon | 75/84.5 |
| 4,556,420 | 12/1985 | Evans | 75/84.5 |
| 4,613,366 | 9/1986 | Kwon | 75/84.5 |
| 4,637,831 | 1/1987 | Stoltz | 75/84.5 |
| 4,668,287 | 5/1987 | Kwon | 423/76 |
| 4,670,121 | 6/1987 | Ginatta | 204/225 |
| 4,737,244 | 4/1988 | McLaughlin | 203/51 |
| 4,749,448 | 6/1988 | Stoltz et al. | 423/76 |

FOREIGN PATENT DOCUMENTS 2543162 9/1984 France .

OTHER PUBLICATIONS

Plucknett-AEC Report ISC-51-1949.
Mackenzie & Murphy; J. Chem. Phys. 33366 1960.
Williams; U.S. AEC Report NY00-1009, Aug. 1950.

Primary Examiner—Wilbur Bascomb
Attorney, Agent, or Firm—R. A. Stoltz

[57] ABSTRACT

Improvements are described to a process in which the extractive distillation separation of zirconium or hafnium may be accomplished using mixtures of fused alkali metal or alkali metal and alkaline earth chlorides as the solvent. The solvent composition is adjusted to provide a low-melting eutectic, permitting recirculation of the stripped solvent in the liquid phase, as well as reducing the temperature required for thermal stripping (reducing the corrosivity of the fluid). Stripping of the bottoms is accomplished at least partially by direct electrolysis of the bottoms stream, producing the zirconium-free salt recycle stream to be transferred to the top of the column, and at least partially eliminating the need for chemical reduction of the tetrachlorides to metal (a costly process generating undersirable waste streams). Regeneration of the reflux is accomplished in a presurized condenser system, of one or more stages, with all material transport to be done in either the liquid or vapor states.

3 Claims, 2 Drawing Sheets

MOLTEN SALT EXTRACTIVE DISTILLATION PROCESS FOR ZIRCONIUM-HAFNIUM SEPARATION

CROSS-REFERENCE TO RELATED APPLICATIONS

A process for zirconium-hafnium separation is described in related application Ser. No. 242,574, filed Sept. 12, 1988 and assigned to the same assignee. That realted application utilizes a complex of zirconium-hafnium chlorides and phosphorus oxychloride prepared from zirconium-hafnium chlorides with the complex of zirconium-hafnium chloides and phosphorus oxychloride being introduced into a distillation column and a hafnium chloride enriched stream is taken from the top of the column and a zirconium enriched chloride stream is taken from the bottom of the column, and in particular with prepurifing said zirconium-hafnium chlorides prior to introduction of said complex into a distillation column to substantially eliminate iron chloride from the zirconium-hafnium chlorides, whereby buildup of iron chloride in the distillation column is substantially eliminated and the column can be operated in a continuous, stable manner.

A improved process for prepurification of zirconium-hafnium chlorides prior to preparation of a complex of zirconium-hafnium chlorides and phosphorus oxygchloride for use in a distillation column for zirconium-hafnium separation is described in related application Ser. No. 242,572, filed Sept. 12, 1988 and assigned to the same assignee. That related application utilizes prepurification of zirconium-hafnium chlorides prior to complexing with phosphorus oxychloride by passing the zirconium-hafnium chloride through an essentially oxygen-free molten salt purification-sublimation system, and at least periodically removing iron chloride from the molten salt purification-sublimation system by electrochemically plating iron out of molten salt purification-sublimation system. The molten salt in the molten salt purification-sublimation system consisting essentially of a mixture of alkali metal and alkaline earth metal chlorides, zirconium-hafnium chlorides and impurities.

A process for zirconium-hafnium separation is described in related application Ser. No. 242,571, filed Sept. 12, 1988 and assigned to the same assignee. That related application utilizes a complex of zirconium and hafnium chlorides and phosphorus oxychloride introduced into a distillation column, with a hafnium chloride enriched stream of complex taken from the top of the column and a zirconium enriched chloride stream of complex taken from the bottom of the column, followed by reduction of the zirconium or hafnium chloride from complex taken from the distillation column by electrochemically plating zirconium or hafnium out of a molten salt bath with the molten salt in the molten salt bath consisting principally of a mixture of alkali metal and lakaline earth metal chlorides and zirconium or hafnium chloride.

A process for zirconium-hafnium reduction and possibly also separation is described in related application Ser. No. 242,564, filed Sept. 12, 1988 and assigned to the same assignee. That related application utilizes a reduction to metal of the zirconium and/or hafnium chloride by electrochemically reducing an alkaline earth metal in a molten salt bath with the molten salt in the molten salt bath consisting principally of a mixture of at least one alkali metal chloride and at least one alkaline earth metal chloride and zirconium or hafnium chloride, with the reduced alkaline earth metal reacting with the zirconium or hafnium chloride to produce zirconium or hafnium metal product and alkaline earth metal chloride.

A process for separating nickel from zirconium for recycling nickel-containing zirconium alloy is described in related application Ser. No. 242,573, filed Sept. 12, 1988 and assigned to the same assignee. That related appliation utilizes placing nickel-containing zirconium in a molten salt bath with the molten salt in the molten salt bath consisting principally of a mixture of at least two alkali metal fluorides to produce a molten salt bath containing dissolved zirconium and dissolved nickel, electrochemically plating the nickel from the molten salt bath at a voltage sufficient to plate nickel but less than the voltage to plate zirconium to provide an essentially nickel-free molten salt bath; and electrochemically reducing the zirconium from the essentially nickel-free molten salt bath to provide an essentially nickel-free zirconium.

A process for removing phosphorus oxychloride from a complex of zirconium or hafnium chloride and phosphorus oxychloride is described in related application Ser. No. 242,562, filed Sept. 12, 1988 and assigned to the same assignee. That related application utilizes a lithium-potassium chloride molten salt absorber vessel with a condenser which has the complex of zirconium or hafnium chloride and phosphorus oxychloride as the condensing fluid to scrub zirconium or hafnium chloride from the phosphorus oxychloride vapor. The process uses at least one separate vessel to strip the zirconium or hafnium chloride from the lithium-potassium chloride molten salt.

All of the above-related applications are assigned to the same assignee and are hereby incorporated by reference herein.

BACKGROUND OF THE INVENTION

This invention relates to molten salt distillation to separate hafnium from zirconium and in particular relates to using a molten salt solvent consisting principally of lithium chloride and at least one of sodium, magnesium and calcium chlorides, electrolytic stripping and high pressure condensing.

Molten (fused) chloride salt electrochemical (electrolytic) processes for deposition of metal on one electrode (with evolution of chlorine gas at the other electrode) are known in the art. U.S. Pat. Nos. 3,764,493 to Nickes et al, and 4,670,121 to Ginatta et al are examples of such processes.

Modifications to the reduction process have been suggested in many U.S. Patents, including U.S. Pat. Nos. 4,511,399; 4,556,420; 4,613,366; 4,637,831; and 4,668,287, assigned to the same assignee. A high temperature process using zirconium tetrachloride as a part of a molten salt bath and reducing zirconium from the chloride to the metal (molten salt systems mentioned were potassium-zirconium chlorides and sodium-zirconium chlorides) is suggested in U.S. Pat. No. 2,214,211 to Von Zeppelin et al. A relatively high temperature process using zirconium tetrachloride as a part of a molten salt bath and introducing magensium to reduce zirconium from the chloride to the metal (with external electrolytic reduction of magnesium from the chloride to the metal, to recycle magneisum) is suggested in U.S. Pat. No. 4,285,724 to Becker et al. Another high temperature process using zirconium tetrachloride as a part of a molten salt bath and which introduces sodium-magnesium alloy to reduce zirconium from the chloride to the metal (with a molten salt of magnesium chloride and sodium chloride is suggested in U.S. Pat. No. 2,942,969 to Doyle. Using zirconium tetrachloride as a part of a molten salt bath and preferably introducing aluminum (but possibly magnesium) to reduce zirconium from the chloride to the metal, generally with the aluminum being introduced dissolved in a molten zinc, is taught by Megy in U.S. Pat. No. 4,127,409. A two-step reduction process is taught is British Patent No. 810,428, issued to National Distillers, which reacts gaseous zirconium tetrachloride with molten sodium at 325°–400° C. to form zirconium dichloride, and then with sodium at about 900° C. to obtain zirconium metal, Electrolytic-refining (metal in, metal out purification, rather than reduction from the chloride) processes are suggested in U.S. Pat. Nos. 2,905,613 and 2,920,027.

Direct electrolysis of zirconium has been reported in all-chloride molten salt systems, in mixed chloride-fluoride systems, and in all fluoride systems (Martinez et al., Metall. Trans., 3, 571 1972; Mellors et al., J. Electrochem. Soc., 113, 60 1966). All-metallic deposits were obtained from fluoride-containing baths (e.g. at 800° C. using sodium fluorozirconate), but the efforts to plate out of all-chloride baths always produced a significant amount of subchlorides.

Naturally occurring zirconium ores generally contain from 1 to 3 percent hafnium oxide relative to zirconium oxide. In order that the zirconium metal be acceptable as a nuclear reactor material, the hafnium content must first be reduced to low levels, due to the high neutron absorption cross section of harnium. This separation process is difficult due to the extreme chemical similarity of the two elements. A number of techniques have been explored to accomplish this separation, with the technique currently in use in the United States involving liquid-liquid extraction of aqueous zirconyl chloride thiocyanate complex solution using methyl isobutyl ketone, generally as described in U.S. Pat. No. 2,938,679, issued to Overholser on May 31, 1960, with the removal of iron impurities prior to solvent extraction as described in U.S. Pat. No. 3,006,719, issued to Miller on Oct. 31, 1961.

Several other processes have been suggested for separation of the metal tetrachlorides generated from the ore by carbochlorination. The use of a nonaqueous separation offers significant economic incentive over those processes requiring aqueous zirconium solutions. Direct distillation of the tetrachlorides provides one possible route, relying on the difference in boiling points between zirconium tetrachloride and hafnium tetrachloride. Unfortunately, direct distillation cannot be accomplished at near atmospheric pressure, since neither tetrachloride exhibits a liquid phase except at very high pressure. U.S. Pat. No. 2,852,446, issued to Bromberg on Sept. 16, 1958, describes a high pressure distillation process where the pressure, rather than a solvent, provides for a liquid phase.

U.S. Pat. No. 2,816,814 issued to Plucknett on Dec. 17, 1957, describes extractive distillation for separation of the tetrachlorides using a stannous chloride solvent. U.S. Pat. No. 2,928,722 to Scheller, issued Mar. 15, 1960, describes the batch fractional distillation of niobium and tantalum chlorides to separate these chlorides from each other and from other chloride impurities, and uses a "flux" to provide the molten salt phase, utilizing either zirconium tetrachloride-phosphorus oxychloride complex or an alkali metal chloride and aluminum (or iron, or zirconium) chloride mixture as the flux. U.S. Pat. No. 3,966,458 issued to Spink on June 29, 1976 provides a sodium-potassium chloride solvent for use in the extractive distillation of zirconium and hafnium tetrachlorides. U.S. Pat. No. 3,671,186 issued to Ishizuka on June 20, 1972 utilizes a series of dissolution and evaporation stages with a solvent such as sodium chloride. U.S. Pat. No. 4,021,531 issued to Besson on Apr. 3, 1977, utilizes extractive distillation with an alkali metal chloride and aluminum (or iron) chloride mixture as the solvent. Extractive distillation of zirconium (hafnium) tetrachloride with a pure zinc chloride solvent has been attempted (Plucknett et al., AEC Report ISC-51, 1949), but was unsuccessful due to the formation of a highly viscous two-phase system. The anomalously high viscosity of zinc chloride is described by MacKenzie and Murphy (J. Chem. Phys., 33, 366, 1960). U.S. Pat. No. 4,737,244 to McLaughlin et al. describes an extractive distillation method for separating hafnium from zirconium of the type wherein a mixture of zirconium and hafnium tetrachlorides is introduced into a distillation column, with a molten salt solvent being circulated through the column to provide a liquid phase, and the improvement comprising having a molten salt solvent composition of at least 30 mole percent zinc chloride and at least 10 mole percent of lead chloride.

Of all of the molten salt distllation processes, only the above-mentioned Besson process has been brought to commercial development. This process is currently in use in France and provides product zirconium tetrachloride, relatively depleted of hafnium tetrachloride in the liquid bottoms stream, and a hafnium tetrachloride enriched vapor stream taken from the top of the column. A relatively high reflux is provided by a condenser at the top of the column and a reboiler at the bottom of the column. Because of the stability of the double salts formed with the alkali metal chloride in the solvent, it is very difficult to completely separate the product zirconium tetrachloride from the solvent, and relatively high (e.g. 500° C.) temperatures are required. Aluminum chloride in excess of 1:1 molar to alkali metal chloride is required and there is considerable carry-over of aluminum chloride into the zirconium tetrachloride leaving the stripper. French Patent No. 2,543,162 (9-28-84) to Brun and Guerin describes a post-stripping process for removing aluminum chloride. In addition, it should be noted that aluminum chloride is an especially hygrosocpic and corrosive molten salt, and, at higher temperatures, is very difficult to handle.

Another separation process involves fractionation of the chemical complex formed by the reaction of $(Zr,Hf)Cl_4$ with phosphorus oxychloride ($POCl_3$). This technique was patented in 1926 by van Arkel and de Boer (U.S. Pat. No. 1,582,860), and was based on the approximately 5° C. boiling point difference between the hafnium and zirconium complex pseudoazeotropes, having the nominal compositions $3(Zr, Hf)Cl_4:2POCl_3$. This composition may be produced by direct reaction between liquid phosphorus oxychloride and the crude zirconium (hafnium) tetrachlorides obtained from opening of the ore.

Extensive work (e.g. Williams et al., U.S. AEC Report NY00-1009, August (1950) was done on the zirconium-hafnium tetrachloride complex with phosphorus oxychloride in the early 1950s, utilizing generally the molten salt distillation process of the aforementioned U.S. Pat. No. 1,582,860 of van Arkel and de Boer. While this extensive effort did provide some separation, the process was very difficult to control, and both the reboiler liquid volatility and the Hf/Zr separation factor degraded significantly with time. Despite the extensive investment in time and money, this approach was abandoned and the U.S. effort was concentrated on the liquid-liquid extraction described in the above-mentioned U.S. Pat. No. 2,938,769 of Overholser. The liquid-liquid extraction remains the only commercially utilized process for zirconium-hafnium separation in the Unites States today.

SUMMARY OF THE INVENTION

This is a process for zirconium-harnium separation of the type which utilizes an extraction distillation column with a mixture of zirconium and hafnium tetrchlorides introduced into the distillation column and a molten salt solvent circulated through the column to provide a liquid phase, and in particular, the improvement comprising utilizing a molten salt solvent consisting principally of lithium chloride and at least one of sodium, potassium, magneisum, and calcium chlorides; stripping of the zirconium chloride taken from the bottom of distillation column by electrochemically reducing zirconium from the molten salt solvent; and utilizing a pressurized reflux condenser on the top of the column to recombine hafnium-zirconium chloride overheads product with the previously stripped molten salt solvent which is being circulated back to the top of the column. Preferably, the solvent consists essentially of lithium chloride, sodium chloride and magnesium chloride, and preferably the solvent is stirpped in two stages, first by thermal stripping and then by electrolytic stripping.

BRIEF DESCRIPTION OF THE DRAWINGS

The invention may be better understood by reference to the drawings, in which.

DESCRIPTION OF THE PREFERRED EMBODIMENTS

This method provides an extractive distillation system for separating or zirconium-hafnium chlorides, and in particular uses a high pressure condenser and electrolytic stripper to provide a relatively low temperature, all-fluid system utilizing a primarily alkali metal chloride solvent.

Providing the reflux stream is believed to be the primary obstacle which has prevented successful commercialization of this process. To generate the required reflux stream for distillation, two operations must be performed. Unlike a simple distillation in which the reflux is generated by condensation of part of the overheads, in extractive distillation relfux must be supplied by recirculation of the nonvolatile solvent from the bottoms. Therefore, before the bottoms stream canb e reciruclated to the reflux, the roughly $(\frac{2}{3})ZrCl_4$-$(\frac{1}{3})$MCl mixture must first be stripped of $ZrCl_4$ as completely as possible, since recirculation of significant quantities of zirconium back to the top of the column would destroy the Zr-Hf separation factor. The clean salt must then be transferred to the top of the column, and recontacted with the overheads vapor stream to regenerate the distillation mixture.

Figure 1:
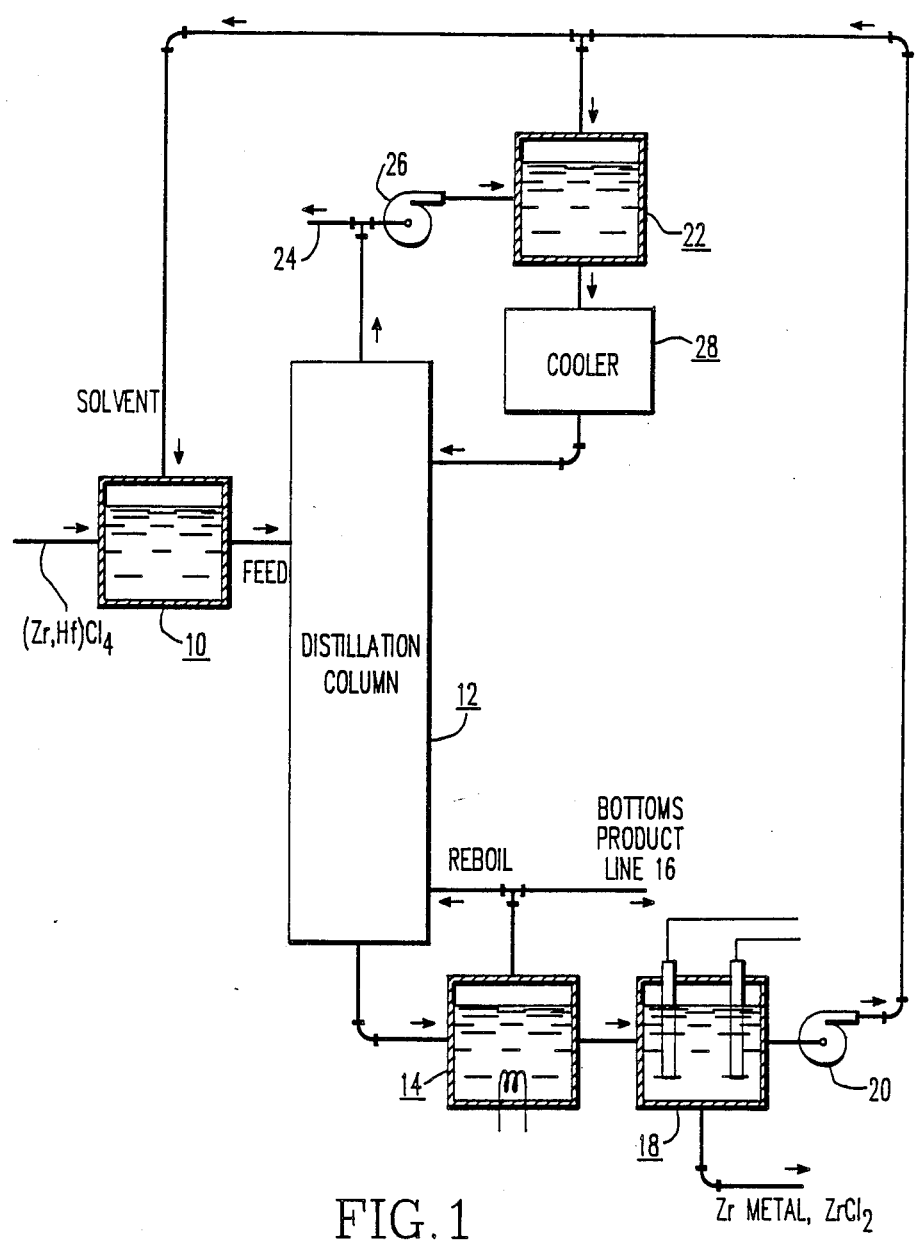
FIG. 1 is a schematic process diagram of zirconium-hafnium separation by the extractive distillation of this invention.

Consider first the stripping generation, given as (78%) KCl-(22%) NaCl molten salt solvent. The phase diagram for NaCl-$ZrCl_4$ (Howell, Sommer, and Kellogg, Trans. AIME, J. Metals, 209, 193, 1957) is shown in FIG. 1; the NaCl-KCl is expected to be similar in structure although differing in detail. The operating point for the distillation system is near the ternary eutectic at 63% $ZrCl_4$, near which are shown curves of constant $ZrCl_4$ vapor pressure. It may be seen that approximately 1 atm of vapor pressure may be obtained near 360° C., similar to the ternary $ZrCl_4$-KCl-NaCl system. As the temperature of the bottoms product stream is increased in the stripping system, the vapor pressure rises, and $ZrCl_4$ will be evolved from the stream. However, as the $ZrCl_4$ content of the mixture begins to fall, the fusion temperature begins to rise rapidly, such that when the $ZrCl_4$ mole fraction has been reduced to 33%, the melting point has increased to 646° C., corresponding to the stable $Na_2ZrCl_6$ double salt. (Note that in the case of the ternary NaCl-KCl-$ZrCl_4$ system, the most stable double salt would be $K_2ZrCl_6$, which has an even higher melting point of 799° C.). Therefore, to prevent precipitation of solids in the stripper, stripping must be carried out at least at 799° C.

The stability of the potassium-zirconium double salt requires that thermal stripping in fact be carried out at even higher temperatures approaching 900° C., in order to accomplish complete removal of the zirconium tetrachloride (Spink and Jonasson, Proc. Extr. Metall. Refract. Met. Proc. Symp., 1981, p. 297). At this temperature, the chloride mixture is highly corrosive, with the expensive Hastelloy B-2 alloy being the only material tested by Spink and Jonasson which approached satisfactory operation. Complete removal of $ZrCl_4$ can even then only be accomplished with the assistance of vacuum, creating a complex high-temperature system susceptible to influx of atmospheric air and moisture through joints and seals. Note that moisture would not only hydrolyze the tetrachloride, making it unsuitable for further processing without rechlorination, but would also generate HCl which would greatly accelerate material corrosion.

Once the $ZrCl_4$ has been recovered from the bottoms stream, the salt must then be recycled to the top of the column. Continuous operation would dictate transport of this recycle stream as a liquid, but in order to maintain the (22%) NaCl-(78%) KCl mixture in the fluid phase, the temperature would have to be kept above 730° C., making pumping an extremely difficult undertaking. The clean salt must therefore be solidified (by prilling for example), and then mechanically lifted to the reflux contactor.

At this point, overheads vapor could be sparged into the condenser, consisting of a vessel containing molten ternary eutectic, to which solid NaCl-KCl was continuously added. Flow control is difficult in such a system, and close temperature control would be required in order to passure the proper reflux composition. The combination of these problems is believed to have prevented successful commecialization of this process.

The present invention provides several improvements to the above process, which avoid the necessity of such high temperatures in the reboiler stripper, eliminate the need for a vacuum system to accomplish polishing stripping, provide for a fully-molten recirculation stream at moderate temperatures, and simplify control of the reflux condenser. These improvements are accomplished by (1) use of a modified solvent composition, taking advantage of the lower eutectic temperatures available by addition of such species as LiCl and MgCl$_2$ to provide a fully-liquid system at reduced temperature, (2) use of the above solvent compositions, taking advantage of the lower stability of the double salt complexes formed in the presence of such species as LiCl and MgCl$_2$ to permit stripping at lower temperatures, (3) use of an electrolytic polishing stripper to accomplish quantitative ZrCl$_4$ removal without excessive temperatures or vacuum, and (4) use of a pressurized liquid-vapor condenser/contactor to accomplish generation of the reflux system.

Instead of using high-melting pure NaCl or NaCl-KCl eutectic as the reagent, a mixture of alkali metal or alkali metal and alkaline earth chlorides is used, blended in such proportions as to form a low-melting-point eutectic or near-eutectic mixture. Possibilities include NaCl-LiCl (551° C.), KCl-LiCl (361° C.), and NaCl-MgCl$_2$ (450° C.). A number of relatively low-melting binary or ternary eutectics are therefore available by judicious selection of reagents, such that the displacement reagent may be fully stripped, and then recirculated at moderate temperatures in the molten form rather than the solid.

Modification of the solvent will change the solubility of ZrCl$_4$ in the fluid, increasing or decreasing both its vapor pressure at a given temperature, and the required stripping temperature to regenerate zirconium-free solvent. All of the alkali metal chlorides (LiCl, NaCl, KCl, RbCl, CsCl) are known to form double salts with zirconium tetrachloride, with the stability of the complex increasing with the molecular weight of the alkali metal chloride (Flengas and Pint, Can. J. Metall., 8, 151, 1969). In addition, stable complexes also exist with the alkaline earth metal chlorides SrCl$_2$ and BaCl$_2$; the theoretical complexes formed with the lower molecular weight members of this group (MgCl$_2$ and CaCl$_2$) are apparently too unstable to exist as pure compounds. Addition of these latter two species of LiCl to a stable double salt system will therefore tend to reduce its stability, increasing the ZrCl$_4$ vapor pressure and lowering the decomposition temperature. The reactivity of the solvent towards Zr(Hf)Cl$_4$ (i.e., the stability of the double salt) may be therefore adjusted by addition of chlorides such as LiCl having lower stabilities, or MgCl$_2$ which do not form stable double salts but rather serve to decrease the stabiliyt of the existing double salts in solution.

An example of this utilizes the LiCl-KCl eutectic mixture, melting at 361° C. The relative stabilities of the lithium and potassium double salts are indicated by their decomposition temperatures, defined as the temperature at which the vapor pressure of dissociated ZrCl$_4$ over the pure double salt becomes one atmosphere. For K$_2$ZrCl$_6$, this temperature is 831° C., and for Li$_2$ZrCl$_6$ it is only 501° C. Because of the considerably greater stability of the potassium double salt relative to the lithium, chemial equilibrium considerations would indicate that most of the zirconium chloride in the system would exist as K$_2$ZrCl$_6$. However, the presence of the LiCl causes the solubility of ZrCl$_4$ in the solution to decrease over what would be observed in a pure KCl metl at the same temperature, so that a considerably lower temperature than 831° C. would actually be required to recover ZrCl$_4$ from this eutectic.

Because of the reduced affinity of the solvent towards zirconium tetrachloride, operation of an extractive distillation column at 360° C. using ZrCl$_4$-LiCl-KCl in place of ZrCl$_4$-NaCl-KCl would therefore run either at the same zirconium loading and higher pressure, or at the same pressure with lower zirconium content in the melt. Although the reduced solvent loading is an economic disadvantage, it is outweighed by the advantages provided by (1) the much lower temperature required to strip ZrCl$_4$ out of the solvent when generating the recycle stream, leading to reduced corrosion rates and less expensive materials of construction; and (2) the fact that the solvent reamins in the liquid state in the absence of ZrCl$_4$, at or near the column operating temperature, eliminating the need for solids handling and transport.

The second improvement involves use of a (preferably two-stage) stripping system for the bottoms stream. Although a much lower stripping temperature can be utilized if proper solvent compositions are maintained, complete removal of ZrCl$_4$ from the bottoms solvent stream would still require temperatures higher than desired, and possibly use of vacuum. Once the bulk of the zirconium tetrachloride has been removed in the primary stripper, a secondary electrolytic stripper may be used to accomplish the polishing stripping, without resorting to either high temperatures or vacuum. The utility of such an electrolytic stripper in this system may be seen by examining the electromotive potentials for reduction of various metal ions in fused salts. Examples for the LiCl-KCl eutectic solvent are shown in Table 1, (selected values from longer table of Plambeck, J. Chem. Eng. Data, 12, 77, 1967). Solution-phase reduction may, therefore, be carried out either purely electrolytically, or by reaction with a reducing agent such as Mg or Na (metallothermically).

It is seen that if the solvent contains only alkali metal and alkaline earth metal chlorides, zirconium and hafnium may be completely reduced to the metallic form in molten salt solution without decomposition of the solvent. It would not, however, be useful for a solvent containing such ionic species as Al(III), Zn(II), Sn(II), or Fe(III), since these species would reduce preferentially to zirconium. Its use would also be limited to those solvent compositions remaining in the liquid state following removal of zirconium at the stripper operating temperature. Electrolytic stripping therefore provides a useful alternative to thermal stripping for the process under consideration, which (1) does not require the very high temperatures and associated corrosion rates of thermal stripping to accomplish quantitative removal of zirconium from the salt, (2) provides a metallic product which does not have to be

TABLE 1

| Electromotive Potentials in Fused LiCl—KCl Eutectic at 450° C. | | |
|---|---|---|
| Li(I) | Li(O) | −3.30 |
| Na(I) | Na(O) | −3.25 |
| Mg(II) | Mg(O) | −2.58 |
| Zr(IV) | Zr(II) | −1.86 |
| Hf(IV) | Hf(O) | −1.83 |
| Zr(IV) | Zr(O) | −1.81 |
| Al(III) | Al(O) | −1.76 |
| Zr(II) | Zr(O) | −1.75 |
| Ti(II) | Ti(O) | −1.74 |
| Zn(II) | Zn(O) | −1.57 |
| Ti(IV) | Ti(O) | −1.49 |
| Fe(II) | Fe(O) | −1.17 |
| Sn(II) | Sn(O) | −1.08 |
| Ni(II) | Ni(O) | −0.80 |
| Cr(III) | Cr(O) | −0.65 |

TABLE 1-continued

Electromotive Potentials in Fused
LiCl—KCl Eutectic at 450° C.

| | | |
|---|---|---|
| Fe(III) | Fe(O) | −0.36 |
| Fe(III) | Fe(II) | +0.09 |
| $Cl_2(g)$ | $C/Cl^-$ | +0.32 | subsequently reduced by the expensive Kroll reduction process currently in general use for this purpose, and (3) generates chlorine gas for reuse in opening of the zirconium ore. Electrolytic stripping could be used by itself to remove all of the $ZrCl_4$ from the bottoms stream, or in the preferred embodiment could be used as secondary stripper for removal of the last small amounts of dissolved zirconium.

Figure 2:
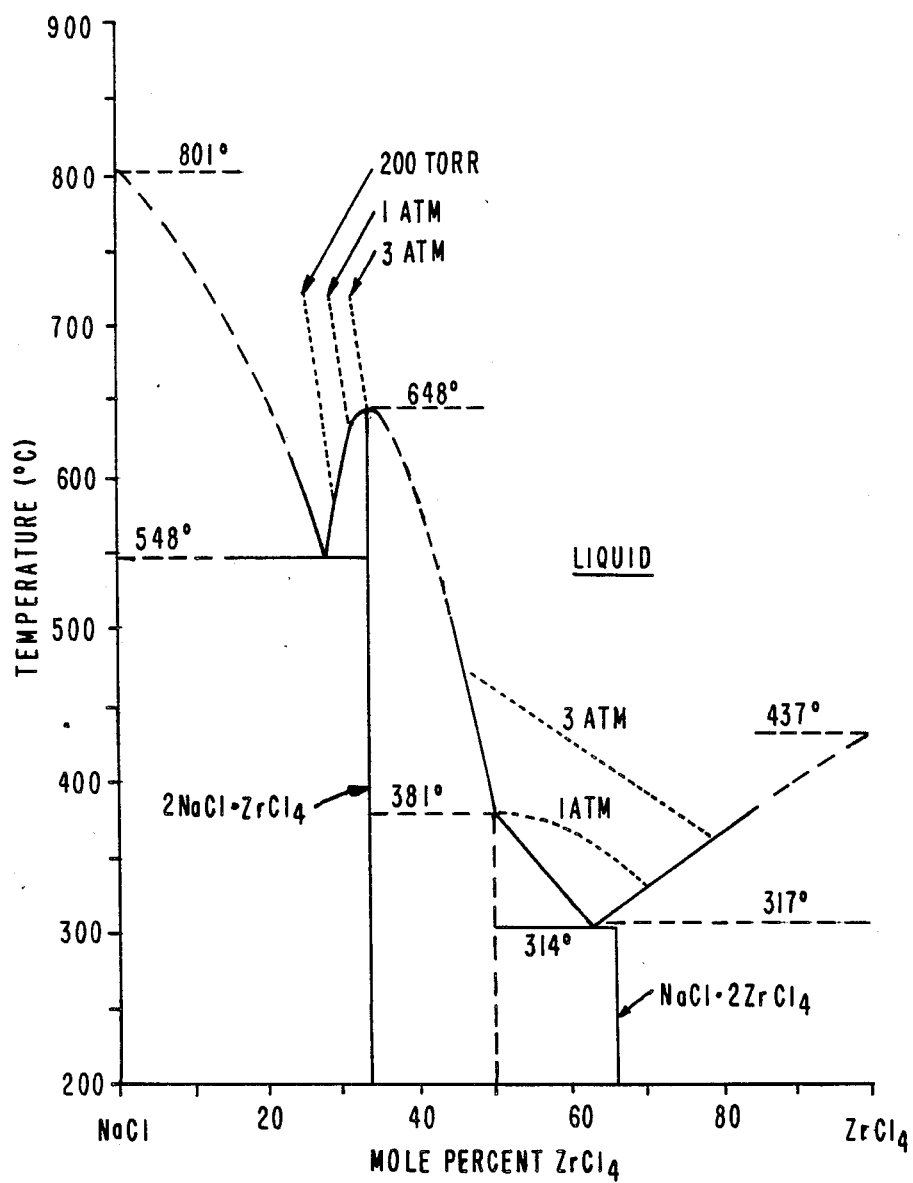
FIG. 2 is a phase diagram of the $ZrCl_4$-NaCl system.

The third improvement follows from the first two, involving regeneration of the reflux stream. Depending on the specific solvent composition involved, it may be necessary to maintain the solvent at a temperature above the decmoposition temperature of the associated $ZrCl_4$ double salts in order to keep the solvent fully molten. Precipitation of MCl could occur if the solvent were cooled in order to inject $ZrCl_4$ back into the solvent, although the solids would redissolve as the zirconium content of the mixture increased (see FIG. 2). The fundamental problem is therefore how to get the zirconium chloride content past the liquidus maximum (which occurs at the $M_2ZrCl_6$ composition), and into the low-melting regime near 60% zirconium at which the column will operate.

This can be done by use of an elevated pressure condenser. If the pressure of the overheads vapor is increased to above the vapor pressure of $(Zr, Hf)Cl_4$ at the $M_2(Zr,Hf)Cl_6$ liquidus temperature, then sufficient tetrachloride can be dissolved in the metal to permit the mixture to be cooled without precipitation. Regeneration of the reflux streams might therefore be best accomplished in two or more stages, with each subsequent stage operating at lower temperature anf pressure than the preceding stage, finally resulting in the desired composition and column operating temperature. Such a system provides much easier control of both temperature and composition than a single stage contactor operating at atmospheric pressure. While condensers for such systems generally operate at a temperature lower than the column, this condenser or sequence of doneser stages operates at a temperature higher than the column.

A schematic flow diagram of the overall process, including the improvements detailed above, is shown in FIG. 1.

The zirconium-hafnium tetrachloride is shown being mixed with a lithium-potassium-magensium chloride solvent in a feed make up contactor 10, which feeds the distillation column 12 (alternatively the zirconium-hafnium tetrachloride can be fed in as a vapor). The distillation column 12 includes a reboiler/thermal stripper 14 receiving the liquid stream from the distillation column 12, with the vapor from the thermal stripper 14 being both returned to the bottom of the distlation column 12 and taken off as bottoms product through line 16. Liquid from the thermal stripper 14 is fed to the electrolytic stripper 18 where particulate zirconium metal and zirconium dichloride are electrolytically reduced and precipitated. Recirculating liquid pump 20 returns the solvent to the feed make up contactor 10 and also introduces solvent into the reflux condenser 22. Hafnium chloride enriched overheads from the distillation column is partially taken off as product through vapor product line 24, and the remainder of the overheads is pressurized by vapor compressor 26 and introduced into the reflux condenser solvent. Condensed overheads are then passed through cooler 28 and refluxed as liquid to the top of the distillation column. As noted above, the thermal stripper is optional, multi-stage reflux condenser/contactors may be desired, and, of course, many other variations are possible, such as using a separate reflux reboiler and thermal stripper.

Generally, the electrolytic stripper will produce a zirconium powder product which is a combination of metal and dichloride particles. The dichloride particles (which are highly pyrophoric and must be handled carefully) can be reduced to metal by, for example, reacting them with molten sodium, as described in the aforementioned British Patent No. 810,428. The stripper can, however, incorporate the process for zirconium-hafnium reduction described in the aforementioned related application Ser. No. 242,564. That related application utilizes a reduction to metal of the zirconium and/or hafnium chloride by electrochemically reducing an alkaline earth metal chloride in a molten salt bath with the molten salt in the molten salt bath consisting principally of a mixture of at least one alkali metal chloride and at least one alkaline earth metal chloride and zirconium or hafnium chloride, with the reduced alkaline earth metal reacting with the zirconium or hafnium chloride to produce zirconium or hafnium metal product and alkaline earth metal chloride.

This invention is not to be construed as limited to the particular examples described herein, as this is to be regarded as illustrative, rather than restrictive. The invention is intended to cover all processes which do not depart from the spirit or the scope of the invention.

We claim:

1. In a process for zirconium-hafnium separation which utilizes an extractive distillation column with a mixture of zirconium and hafnium tetrachlorides introduced into a distillation column having a top and a bottom with hafnium enriched overheads taken from the top of the column and a molten salt solvent circulated through the column to provide a liquid phase, and with molten salt solvent containing zirconium chloride being taken from the bottom of the distillation column, the improvements comprising:
 a. utilizing a molten salt solvent consisting principally of lithium chloride and at least one of sodium, potassium, magnesium and calcium chlorides;
 b. stripping of the zirconium chloride taken from the bottom of the distillation column by electrochemically reducing zirconium from the molten salt solvent; and
 c. utilizing a pressurized reflux condenser on the top of the column to add said hafnium chloride enriched overheads to the molten salt solvent previously stripped of zirconium chloride which molten salt solvent is being circulated back to the top of the column.

2. The process of claim 1, wherein said solvent consists essentially of lithium chloride, sodium chloride and magnesium chloride.

3. The method of claim 1, wherein said solvent is stripped of zirconium chloride first by thermal stripping and then by electrochemical reduction.

* * * * *